(No Model.)

P. J. DEACON.
BICYCLE.

No. 529,717. Patented Nov. 27, 1894.

Witnesses.

Inventor.
Percy James Deacon
by Fetherstonhaugh & Co
Attys

UNITED STATES PATENT OFFICE.

PERCY JAMES DEACON, OF TORONTO, CANADA.

BICYCLE.

SPECIFICATION forming part of Letters Patent No. 529,717, dated November 27, 1894.

Application filed April 14, 1894. Serial No. 507,538. (No model.)

*To all whom it may concern:*

Be it known that I, PERCY JAMES DEACON, residing at 214 Wellesley Street, in the city of Toronto, in the county of York, in the Province of Ontario, Canada, have invented certain new and useful Improvements in Bicycles, of which the following is a specification.

My invention relates to improvements in bicycles, and the object of the invention is to devise such a drive for a bicycle that the rider may exercise practically every muscle of the body instead of, as at present, merely using the legs, and it consists essentially of supporting the seat upon a pair of vertical standards which are suitably journaled in the frame and pivotally connected by a pitman to a crank gear wheel which meshes with the gear pinion on the end of the shaft of the drive wheel device, being arranged so that by the forward and backward swinging movement of the seat standard a rotary movement will be communicated to the drive wheel, the parts being otherwise arranged and constructed in detail as hereinafter more particularly explained.

Figure 1:
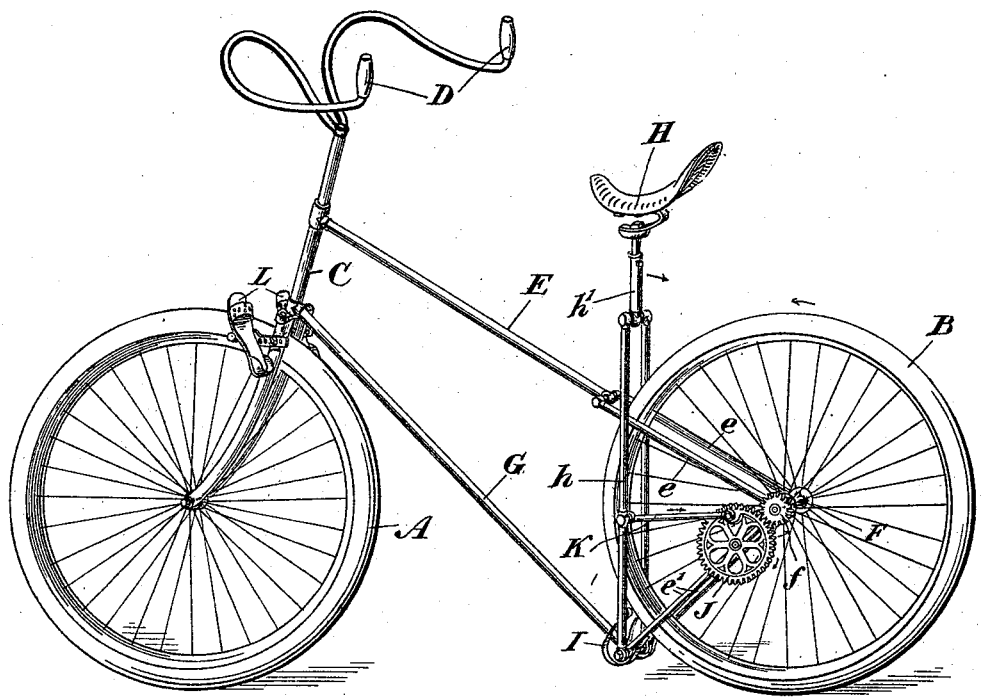
Figures 3, 4:
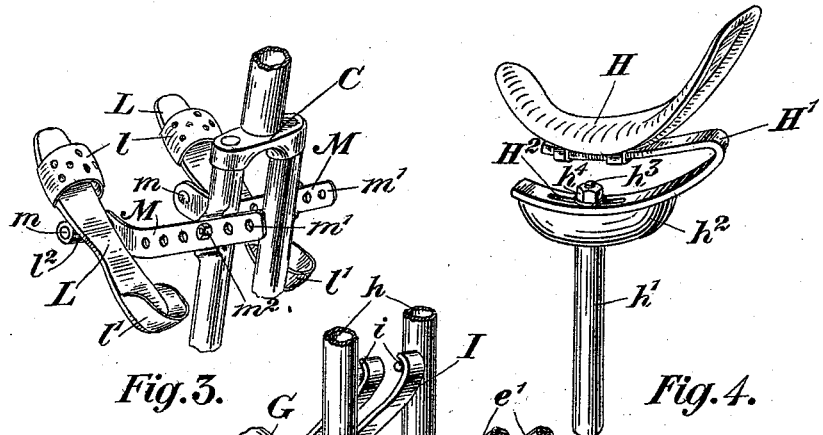
Figure 2:
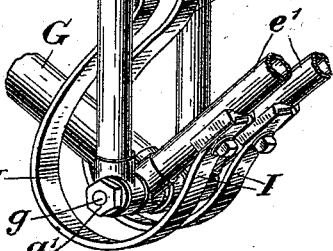

Figure 1, is a perspective view of a bicycle constructed in accordance with my invention. Fig. 2, is a perspective detail showing the journaling of the upright standards and the form of springs designed to normally press them forward. Fig. 3, is a perspective detail of a portion of the front forked standard showing the foot rests secured thereto. Fig. 4, is a perspective detail of the seat and means for adjusting the same.

In the drawings like letters of reference indicate corresponding parts in each figure.

A, is the front, and, B, the rear wheel of the bicycle.

C, is the front forked standard, and, D, the handles.

E, is the upper reach which is forked or made in two parallel rearwardly extending pieces, $e$, through which the axle, F, of the wheel, B, passes.

G, is the lower reach which is suitably secured to the front standard and extends rearwardly and downwardly to the spindle, $g$, which passes through the end of the reach, G, as shown.

$e'$, are two parallel tubes through which the spindle, $g$, also passes, and situated one at each side of the reach, G. The parallel tubes, $e'$, extend upwardly and rearwardly to the axle, F, and preferably form part of the parallel tubes or bars, $e$, the angle being flattened out so as to form a bearing for the axle, F.

$h$, are the two seat standards, each of which is journaled upon the spindle, $g$, to the outside of the parallel tubes or bars, $e'$. Nuts, $g'$, at each end of the spindle, $g$, secure the vertical standards, $h$, in position. The vertical standards $h$, are suitably connected together at the top to the single standard, $h'$.

$h^2$, is a curved end attached to or forming part of the standard, $h'$.

H, is the seat which is secured to the flat spring, H', which is slotted at $H^2$, as shown.

$h^3$, is a screwed spindle which is attached to, or forms part of the spindle, H', and extends through the slot, $H^2$, made in the spring, H'.

$h^4$, is a nut which is screwed onto the top of the spindle, $h^3$, so as to secure the spring, and consequently the seat, in any desired position or desired angle to which it may be changed.

I, are flat springs which are suitably secured at the rear of the tubes, $e'$, and extend in ogee shape to points within the vertical standards, $h$, where their ends press against the pins, $i$. The normal tendencies of the springs, I, are to force the vertical standard, $h'$, forward.

$f$, is the gear pinion secured on the end of the shaft, F.

J, is a gear wheel suitably journaled in bearings secured to one of the tubes, $e'$.

K, is a pitman pivotally connected to the crank gear wheel, J, at one end, and to one of the standards, $h$, at the other.

L, are the foot rests which are preferably provided with front straps, $l$, and heel stops, $l'$, and in bearings, $l^2$, upon which they are pivoted upon the studs, $m$, secured at the end of the curved bars, M. The bars, M, are provided with a series of holes, $m'$, by which they are secured by bolts and nuts, $m^2$, to the forked standard, C, and which also serve as means of adjusting the position of the foot rests.

Having now described the principal parts involved in my invention, I shall briefly describe the position the rider assumes on the bicycle, and the manner in which it is driven.

The rider sits upon the seat, H, and places his feet in the foot rests, *l*, and with his hands as usual grasping the handles, D. In starting the wheel he first presses back upon the seat, H, and then forward so that the pitman, K, will communicate a rotary movement to the crank wheel, J, in the direction indicated by arrow, and thereby drive the pinion, *f*, and consequently the wheel, B, in the proper direction as indicated by arrow. When he moves the seat forward again the motion of the crank wheel will be continued. This constant moving the seat backward and forward and thereby causing a swinging movement to the vertical standard, *h*, which of course, extends at both sides of the wheel as will be seen, gives a forward movement to the bicycle.

In operating the drive such as described above it will be readily understood that the rider will undergo a very exhilarating movement in which he will practically exercise every muscle of the body, and consequently a bicycle constructed in accordance with my invention will be much more healthful than those now commonly in use in which the drive is communicated through the legs alone.

What I claim as my invention is—

1. In a bicycle, in combination with the rods $e'$ and lower reach G connected by the spindle $g$ the upright seat standard $h'$ pivoted to the end of the spindle and the means connected to the seat standard for propelling the bicycle, the springs I having one of their ends secured to the under side of the rods $e'$ back of the seat standard, curved around beneath and in front of said seat standard and projections on the seat standard for engaging the free ends of said springs whereby the said standard is pressed forward, substantially as described.

2. In a bicycle, in combination with the front standard C, the upper reach E, secured thereto, and extending rearwardly and having forked ends connected to the rear axle, the bottom reach G secured to the standard C at one end, the rods $e'$ connected to the reach G, the spindle $g$ journaled at the junction of the rods and reach, the seat standard $h'$ having its lower portion formed of the rods $h$ pivoted on the spindle $g$, said rods straddling the frame and part of the rear wheel, and the pitman K pivoted to said standard above the pivotal point of the standard and extending at right angles thereto, and driving connections between the pitman and axle to propel the bicycle when the standard is rocked substantially as described.

3. In combination with the front standard having its lower portion forked, of the foot rests secured adjustably to said forked portion by brackets having openings therein for the admission of a set screw, said foot rests being pivoted at their center to an arm extending at right angles to said branches, substantially as described.

PERCY JAMES DEACON.

Witnesses:
K. GREENWOOD,
H. G. S. YOUNG.